US010769296B2

(12) United States Patent
Cook et al.

(10) Patent No.: US 10,769,296 B2
(45) Date of Patent: Sep. 8, 2020

(54) SYSTEM AND METHOD OF PERMISSION-BASED DATA SHARING

(71) Applicant: Early Warning Services, LLC, Scottsdale, AZ (US)

(72) Inventors: Michael Cook, Wimberley, TX (US); Brian Ketelsen, Land O Lakes, FL (US)

(73) Assignee: Early Warning Services, LLC, Scottsdale, AZ (US)

( * ) Notice: Subject to any disclaimer, the term of this patent is extended or adjusted under 35 U.S.C. 154(b) by 340 days.

(21) Appl. No.: 14/565,313

(22) Filed: Dec. 9, 2014

(65) Prior Publication Data

US 2015/0161210 A1 Jun. 11, 2015

Related U.S. Application Data

(60) Provisional application No. 61/914,314, filed on Dec. 10, 2013.

(51) Int. Cl.
*G06F 21/62* (2013.01)

(52) U.S. Cl.
CPC .................. *G06F 21/6245* (2013.01)

(58) Field of Classification Search
None
See application file for complete search history.

(56) References Cited

U.S. PATENT DOCUMENTS

| 6,591,355 B2 | 7/2003 | Schuster et al. |
| 7,380,120 B1 | 5/2008 | Garcia |
| 7,512,965 B1 * | 3/2009 | Amdur ............. H04L 63/20 726/1 |
| 7,600,129 B2 | 10/2009 | Libin et al. |
| 7,739,583 B2 | 6/2010 | Barrus et al. |
| 7,783,980 B1 | 8/2010 | Herold |

(Continued)

FOREIGN PATENT DOCUMENTS

| CN | 103338225 | 10/2013 |
| EP | 2651072 | 10/2013 |

(Continued)

OTHER PUBLICATIONS

Mccallister, Guide to Protecting the Confidentiality of Personally Identifiable Information (PII),National Institute of Standards and Technology, NIST Special Publication 800-122, Apr. 2010, US Department of Commerce, Gaithersburg, MD.

*Primary Examiner* — William Spieler
(74) *Attorney, Agent, or Firm* — Kilpatrick Townsend & Stockton LLP

(57) ABSTRACT

A system includes a processor and a memory accessible to the processor. The memory may store instructions that, when executed by a processor, cause the processor to receive first data associated with a first owner and second data associated with a second owner from a data warehouse. The memory further includes instructions that, when executed, cause the processor to selectively filter the first data according to first data sharing permissions defined by the first owner to produce first filtered data, selectively filter the second data according to second data sharing permissions defined by the second owner to produce second filtered data, and provide an output including the first filtered data and the second filtered data to a data requester.

20 Claims, 9 Drawing Sheets

(56) References Cited

U.S. PATENT DOCUMENTS

| | | |
|---|---|---|
| 7,831,199 B2 | 11/2010 | Ng et al. |
| 8,385,385 B2 | 2/2013 | Michaels et al. |
| 8,428,104 B2 | 4/2013 | Michaels et al. |
| 8,521,778 B2 | 8/2013 | James et al. |
| 8,560,456 B2 | 10/2013 | Williams |
| 2002/0049907 A1 | 4/2002 | Woods et al. |
| 2004/0143738 A1* | 7/2004 | Savage ............... G06Q 20/383 713/168 |
| 2005/0044409 A1* | 2/2005 | Betz .................... G06F 21/6245 726/4 |
| 2005/0131757 A1 | 6/2005 | Chan et al. |
| 2006/0156384 A1* | 7/2006 | Minium ............... G06F 21/6218 726/2 |
| 2007/0077665 A1* | 4/2007 | Bump .............. G05B 19/41845 438/14 |
| 2007/0171064 A1* | 7/2007 | Rollo ................. G08B 13/1427 340/572.1 |
| 2008/0189617 A1 | 8/2008 | Covell et al. |
| 2009/0271412 A1* | 10/2009 | Lacapra ............... H04L 67/104 |
| 2010/0036967 A1 | 2/2010 | Caine et al. |
| 2010/0070725 A1* | 3/2010 | Prahlad ............... G06F 11/1453 711/162 |
| 2010/0132044 A1* | 5/2010 | Kogan ................ G06F 21/6245 726/26 |
| 2010/0134247 A1* | 6/2010 | Tuck .................... G06F 21/6245 340/5.83 |
| 2010/0319051 A1* | 12/2010 | Bafna ................... H04L 47/824 726/1 |
| 2011/0119307 A1* | 5/2011 | Unger ............... G06F 17/30867 707/783 |
| 2011/0312303 A1 | 12/2011 | Brush et al. |
| 2012/0017266 A1* | 1/2012 | DiChiara .............. H04L 63/126 726/4 |
| 2012/0072723 A1 | 3/2012 | Orsini et al. |
| 2012/0215812 A1 | 8/2012 | Gilstrap et al. |
| 2012/0291102 A1 | 11/2012 | Cohen |
| 2012/0291103 A1 | 11/2012 | Cohen |
| 2012/0322422 A1* | 12/2012 | Frecks, Jr. ............ H04L 63/302 455/414.1 |
| 2013/0346385 A1 | 12/2013 | Kraftsow et al. |
| 2015/0089062 A1* | 3/2015 | Reiter .................... G06F 9/505 709/226 |

FOREIGN PATENT DOCUMENTS

| | | |
|---|---|---|
| JP | WO2010113484 | 10/2010 |
| JP | WO2012035588 | 3/2012 |
| WO | WO2004013725 | 2/2004 |
| WO | WO2004066076 | 8/2004 |
| WO | WO03071446 | 8/2008 |
| WO | WO2012040231 | 3/2012 |

* cited by examiner

300

302

|  | Category A | Category B | Category C |
|---|---|---|---|
| Use A | Selectable parameters | Selectable parameters | Selectable parameters |
| Use B | Selectable parameters | Selectable parameters | Selectable parameters |
| Use C | Selectable parameters | Selectable parameters | Selectable parameters |

*FIG. 3*

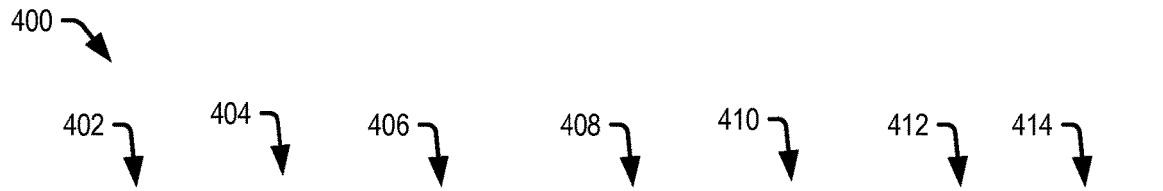

| | Portfolio Type/s | Element/s | Consumer/s | Data Requester(s) | Reseller Data Requester(s) | Fee |
|---|---|---|---|---|---|---|
| Prescreen | Number between 1-999 | Element or elements excluded | List of Consumers with reported ID | Excluded Data Requester IDs | Excluded Reseller Data Requester IDs | $.0025 - $5.00 |
| Extract | Yes or No | Element or elements excluded | List of Consumers with reported ID | Excluded Data Requester IDs | Excluded Reseller Data Requester IDs | $.0025 - $5.00 |
| Bulk | Yes or No or Yes, with fee | Element or elements excluded | List of Consumers with reported ID | Excluded Data Requester IDs | Excluded Reseller Data Requester IDs | $.0025 - $2.00 |
| Collections | Yes or No or Yes, with fee | Element or elements excluded | List of Consumers with reported ID | Excluded Data Requester IDs | Excluded Reseller Data Requester IDs | $.0025 - $5.00 |
| Triggers | Yes or No or Yes, with fee | Element or elements excluded | List of Consumers with reported ID | Excluded Data Requester IDs | Excluded Reseller Data Requester IDs | $.0025 - $5.00 |
| Consumer Monitoring | Yes or No or Yes, with fee | Element or elements excluded | List of Consumers with reported ID | Excluded Data Requester IDs | Excluded Reseller Data Requester IDs | $.0025 - $5.00 |
| "Other" | Yes or No or Yes, with fee | Element or elements excluded | List of Consumers with reported ID | Excluded Data Requester IDs | Excluded Reseller Data Requester IDs | $.0025 - $5.00 |

FIG. 4

SYSTEM AND METHOD OF PERMISSION-BASED DATA SHARING

CROSS REFERENCE TO RELATED APPLICATION

This application is a non-provisional of and claims priority to U.S. Provisional Patent No. 61/914,314 filed on Dec. 10, 2013 and entitled "Permission-Based Data Sharing System and Method," which is incorporated herein by reference in its entirety.

FIELD

This disclosure generally relates to data interchange systems, and more particularly, to data interchange systems having data sharing permissions that are configurable by an administrator of an original owner of the data, which owner may be independent of the data interchange system.

BACKGROUND

Consumer information is widely available, and various organizations capture, store, and resell such information. One possible example of an organization that can capture, store and resell consumer information may include the credit bureaus. Credit bureaus receive personally identifying information from financial companies, such as credit card companies, auto lenders, banks, businesses, and so on, and the credit bureaus may make such information available to a requesting party for a fee. In an example, an automobile finance or a credit card company may purchase, from one of the credit bureaus, consumer information associated with a particular individual or a group of individuals that meet a particular set of criteria. Another possible example of an organization that can capture, store, and resell consumer information is referred to as a data broker. Data brokers purchase data from other data companies, including credit bureaus, and also gather data from their end user customers. This data may be provided to the data broker through direct contribution, or through the process of requesting data on a consumer. This request is called an "inquiry" and the data generated by the inquiry request by the data broker's end customer may be used and stored by the data broker to make additional inferences about a consumer, or develop a follow-on product to offer to its customers.

SUMMARY

In an embodiment, a system includes a processor and a memory accessible to the processor. The memory may store instructions that, when executed by a processor, cause the processor to receive first data associated with a first owner and second data associated with a second owner from a data warehouse. The memory further includes instructions that, when executed, cause the processor to selectively filter the first data according to first data sharing permissions defined by the first owner to produce first filtered data, selectively filter the second data according to second data sharing permissions defined by the second owner to produce second filtered data, and provide an output including the first filtered data and the second filtered data to a data requester.

In another embodiment, a method of providing data according to data sharing permissions includes applying first data sharing permissions to first data to produce first filtered data. The first data sharing permissions may be defined by an owner of the first data. The method further includes applying second data sharing permissions to second data to produce second filtered data. The second data sharing permissions may be defined by an owner of the second data. The method also includes providing an output including the first filtered data and the second filtered data to a data requester.

In yet another embodiment, a data sharing system includes a data warehouse and a data management system. The data warehouse may be configured to store data and corresponding data sharing permissions for each of a plurality of data owners. The data management system may be configured to receive a portion of the data and the corresponding data sharing permissions in response to a request from a data requester. The data management system may be further configured to apply the corresponding data sharing permissions to the portion for each of the plurality of data owners to produce filtered data and to provide the filtered data to the data requester.

BRIEF DESCRIPTION OF THE DRAWINGS

FIG. 3 is an example of an exclusion matrix for use by a system of permission-based data sharing according to some embodiments;

FIG. 4 is a second example of an exclusion matrix for use by a system of permission-based data sharing according to some embodiments;

In the following discussion, the same reference numbers are used in the various embodiments to indicate the same or similar elements.

DETAILED DESCRIPTION

Figure 1:
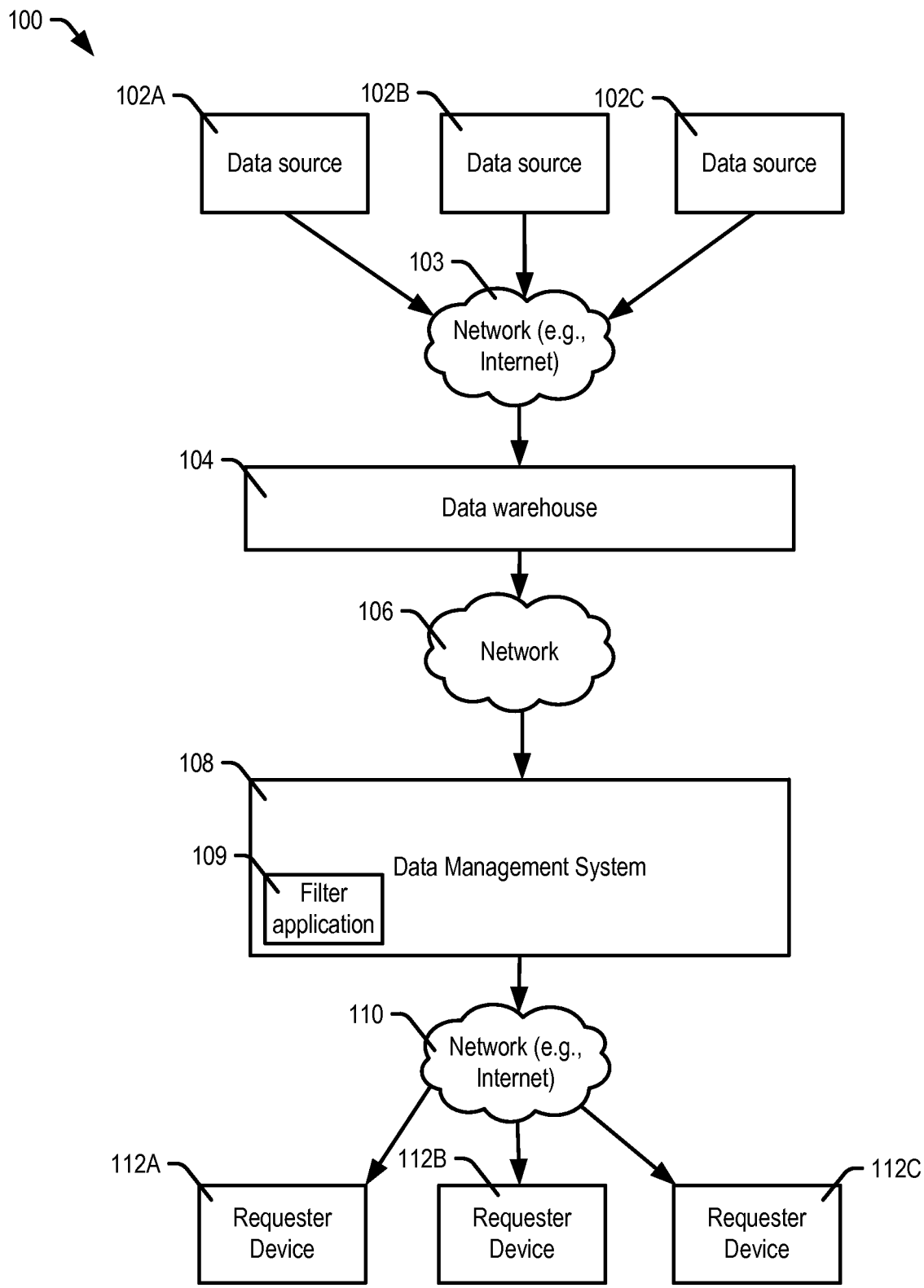
FIG. 1 is a block diagram of a system of permission-based data sharing according to some embodiments.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

Businesses may collect data about their customers. The data may include personally identifiable information associated with individual customers, such as social security numbers, full names, maiden names, address information, phone numbers, email addresses, or any combination thereof. The data may also include non-personally identifiable information data associated with a consumer's behavior, such as spending pattern, payment, delinquencies, purchases, online behavior, website usage or any combination thereof. The personally identifiable information (hereinafter "PII" or "PII data") and non-personally identifiable information (hereinafter "NPI" or "NPI data") may be provided to a data warehouse that may be hosted by another company. In some examples, it may be desirable to share at least a portion of the information with other companies, such as credit bureaus, marketing companies, competitors, and so on; however, some of the PII data, NPI data, or both may include information that may make it easier for competitors to target a company's customers. Accordingly, the owner of the data (e.g. the business that collected the data or the consumer) may be reluctant to share the information because such sharing may benefit the competitor.

Conventionally, financial companies may provide PII and NPI data to the credit bureaus to comply with the Fair Credit Reporting Act, and the credit bureaus may provide the PII and/or NPI data in credit reports. Additionally, in response to a request from a data requester, one or more of the credit bureaus may retrieve the PII and NPI data of those consumers that meet particular criteria and may repackage the PII and NPI data for sale. Data requesters may include businesses such as banks, credit card companies, financial institutions, other companies who have a permissible purpose as outlined by the Fair Credit Reporting Act (FCRA), or any combination thereof. Financial companies and other companies provide PII and/or NPI data to data brokers to request PII and/or NPI data products, and the data brokers may provide the PII and/or NPI data in credit or non-credit reports. Additionally, in response to a request from a data requester, one or more of the data brokers may retrieve the PII and/or NPI data of those consumers that meet particular criteria and may repackage the PII and/or NPI data for sale. Data requesters may include businesses such as banks, credit card companies, marketing companies, financial institutions, or other companies who have permissible purpose as outlined by the Fair Credit Reporting Act (FCRA) or who can access the data for non-credit purposes under Gramm Leach Bliley (GLB), or any combination thereof. The data requesters for bother credit and non-credit PII and NPI may also include domestic and foreign government agencies. In some embodiments, the data requesters can change as the FCRA or GLB are amended or repealed, or as other statues are added to the federal code or in response to a court order.

Embodiments of systems and methods are described below that allow the data owner, such as a company, to retain control over its data while selectively sharing portions of the consumer data with other companies, such as credit bureaus or directly with other companies, making it possible for the data owner to maintain control over how their data is used and to whom the data may be sold. The data owner may upload the PII and/or NPI data or some derivative or characteristics of the data to a data store, such as an offsite data warehouse, and may configure data sharing permissions, defining conditions (e.g. which data and with whom) under which the data may be shared. The data sharing permissions may be stored and associated with the PII and/or NPI data of the company.

Subsequently, the system can receive requests from data requesters (e.g. data buyers) for the PII and/or NPI data or some derivative or characteristics of the data that satisfies a particular set of criteria, and the system can selectively provide portions of the PII and/or NPI or some derivative or characteristics of the data to the data requester according to the data sharing permissions. One example of a data requester may include a credit bureau, which may also collect data about consumers and may repackage and sell such data to credit card companies. In another example, a data requestor or a data requester may include a marketing company, a credit card company, a bank, or another business, or even an individual business, property owner, or individual performing, credit checks, fraud authentication, compliance functions, marketing or acquisition programs, other functions, or any combination thereof.

In some embodiments, a business may upload non-consumer data to the data warehouse. For example, non-consumer data (e.g. data not associated with individuals) such as financial statements, market forecasts, lists of business partners, commercial or industrial customers, or other proprietary or non-proprietary data, may be uploaded to the data warehouse and made available for sale. In some embodiments, proprietary data can include non-public information, which can be information about an individual that is of a private nature, not available to the general public, and not obtained from a public record. For example, proprietary data can include school transcripts, medical records, and so forth.

Referring to FIG. 1, a block diagram of a system of permission-based data sharing according to some embodiments is shown and generally designated 100. In the illustrated example, the system 100 includes a data warehouse 104 that may be coupled to data sources 102A, 102B, and 102C through a network 103. The term "data source" can refer to the company that is the source of the data (e.g. PII data, business data, customer data, other data, or any combination thereof), but can also refer to a "data owner". A data owner may own rights to data that it did not generate, does not possess, or does not host. Each data source (or a user having administrative privileges for the data source) may configure its data sharing permissions, which define how much, with whom, and/or under what conditions its PII and/or NPI data may be shared. In an example, the data source may choose to permit sharing of its PII and/or NPI data with some data requesters, but not others, or may choose to permit sharing of limited portions of its PII and/or NPI data with some data requesters. The permissions and the data may be stored by the data warehouse 104.

Data sources 102A, 102B, and 102C, which may be banks, credit card companies, travel companies, or individual consumers, can upload data sets to the data warehouse 104. The data warehouse 104 can store uploaded data sets from the data sources 102A, 102B, and 102C. Further, the data sources 102A, 102B, and 102C, may configure data sharing permissions corresponding to their respective data sets, and the data sharing permissions may be uploaded to the data warehouse 104 as well. The data warehouse 104 may be coupled to a data management system (DMS) 108 through a network 106. The DMS 108 may be coupled to one or more requesting devices 112A, 112B, and 112C through a network 110, and can include a filter application 109. In the illustrated example, network 103 may be a private or secure network, a public switched telephone network (PSTN), or other network through which the data sources 102A, 102B, and 102C may communicate their data to the data warehouse 104 in a secure manner. Network 106 may also be a private or secure network, a PSTN, or other network through which the data warehouse 104 may communicate securely with DMS 108. In some embodiments, network 103, network 106, and network 110 can be the same.

The DMS 108 may communicate with one or more data requester devices 112A, 112B, and 112C through a network 110. Network 110 may be a public network, such as the Internet. Requester devices 112A, 112B, and 112C may be any computing devices associated with users who request data from the data warehouse 104. A requester device 112 may be a computing device, such as a laptop computer, a tablet computer, a desktop computer, a smart phone, or other device capable of executing software (such as an Internet browser application) and capable of processing data. The DMS 108 may provide a first interface, such as a first GUI, to administrator devices and may provide a second interface, such as a second GUI, to requester devices 112A, 112B, and 112C. In some embodiments, the data warehouse 104 may provide a GUI to data sources 102A, 102B, or 102C. The GUI provided to the requester devices 112A, 112B, and 112C provides an interface that allows the requester to request data corresponding to one or more selected parameters.

In some embodiments, the DMS 108 may provide a GUI to the administrator device associated with the data source 102A through the network 103. The GUI may be accessible by the administrator device to upload data to the data warehouse 104, such as by interacting with a button to access a file upload feature that allows the user to select and upload a data file. In the above example, the PII data may be uploaded manually by the administrator during an initial setup. Subsequently, or in other embodiments, the data source 102A may provide the PII data and/or the changes to the PII data via automatic data transmissions, which may be performed periodically, such as once per month. Such automatic transmissions may be made directly to the data warehouse 104.

Businesses or individuals may choose to sell data to data requesters, but may want to control which pieces of information can be sold to which data requesters, or may specify different data sharing permissions (or parameters) for different types of data requesters. For example, a data source 102, such as a company, may upload consumer data, including the PII and/or NPI data, to the data warehouse 104 where the PII and/or NPI data (or portions thereof) can be made available to data requesters (e.g., credit bureaus, data requesters, data resellers, etc.) according to data sharing permissions, which may be defined by the data source 102.

The data source 102 may upload data to the data warehouse 104 in a variety of formats, including a credit report data format (e.g. METRO 2™), other industry formats, or proprietary or custom formats. The uploaded data may include all consumer provided PII and/or NPI data, including the consumer's name, address, social security number (SSN), date of birth (DOB), home phone, cell phone, and work phone numbers and email addresses (if any). The data warehouse 104 may store the data in one or more databases.

A data requests from the requester may have a unique number that identifies the data requester, the industry in which the data requester operates, the data set to be accessed, data the source, date ranges, currency ranges, consumer criteria, other selections, or any combination thereof. Further, the data request has a unique transaction key that may be assigned to the data request by the data requester. This transaction key may be different from a transaction key generated by the DMS 108. The data request may also include a request "purpose" type of indicator that indicates why the data request is being made (e.g., bulk mailing, marketing, credit reporting, fraud authentication, compliance, etc.).

In an example when the data request type is a credit reporting request, the data provided to the requester may include the unique transaction key from the data requester, the unique transaction key from the DMS 108, and a consumer's current and historical payment information. Further, the report may include the complete PII and/or NPI data that have been reported if the data sharing permissions grant permission to include the full PII and/or NPI data. Otherwise, the report may include a unique data report key and may omit portions of the PII and/or NPI data apart from the financial information. The report may also include the date that the information was last updated to the data warehouse 104, the industry type where the information is derived, the data source, the fee that is to be paid to the data source 102 for accessing the data (if any), or data, or any combination thereof. For credit reporting purposes, the fee will not be charged. The data requester 112 may also access the data in a standard credit report (e.g. METRO 2™) data request format.

On some embodiments, data sources 102A, 102B, and 102C may include administrator devices, such as a terminal, a computer (e.g. desktop, laptop, smart phone, tablet, or other data processing devices), a mobile device, or other device accessible to a user authorized to administer the data sets. The administrator device may present an interface, which may be a graphical user interface (GUI), a website interface, or may be another type of interface such as a command line interface, through which the user may interact with the DMS 108. The GUI may be initialized by logging into a website, or by starting a local program that securely connects to the DMS 108 through the network 103. Through interactions with the GUI, the administrative user may configure one or more data sharing permissions to specify how its data may be used. In an example, the GUI may include user-selectable elements, such as check boxes, radio buttons, pull-down menus, text inputs, or other means of assigning data sharing permissions to the data, to portions of the data, to specific fields within the data, or any combination thereof. A user may also interact with the GUI to configure one or more sharing permissions to specify what PII and/or NPI data, if any, may be shared or sold to different industries, or to particular business or individual consumers, and at what price.

The data sharing permissions may be stored as an "exclusion matrix," such as the exclusion matrix 300 depicted and described with respect to FIG. 3. The GUI may include the exclusion matrix 300 and/or user-selectable elements accessible by the user to configure the various permissions of the exclusion matrix 300. The GUI may be provided to the administrator device by the DSM 108 or by the data warehouse 104. An administrator may configure the data sharing permissions by interacting with the GUI. The data sharing permissions can be stored in the data warehouse 104 and/or the DMS 108. In response to receiving the data and the data sharing permissions, the DMS 108 may generate an executable (such as a binary executable), which may be accessed by the DMS 108 to filter data to be provided to a data requester based on the data sharing permissions provided by the data source(s). The executable(s) can apply the data sharing permissions to filter data retrieved in response to a data request from a requester device 112 to provide a requestor with some, or all, of the requested data. The amount and type of the requested data provided may depend, at least in part, on the data sharing permissions associated with the requested data. For example, the executable(s) can provide a requestor with data from a certain date range, geographical location, income range, other parameters, or any combination thereof, so long as the data sources permit the sharing of data.

Data corresponding to pre-set groupings may be shared by the sources and provided to the requestor. For example, data for credit bureaus may be stored in a credit report format, which may include an individual's name, address, social security number, and so forth. The following discussion assumes that the data source 112 has already uploaded its data and that an administrator has already configured the associate data sharing permissions. The DMS 108 can sell data from the data warehouse 104 to the requester devices 112A, 112B, and 112C at a price set by the data sources 102A, 102B, and 102C via the data sharing permissions. Additionally, the DMS 108 can provide the requester devices 112A, 112B, and 112C with pricing options (e.g. credit reports may have one price, consumer data may have another price, and so forth) corresponding to the data in the data warehouse 104.

In some embodiments, a data source (such as data source 102A) can set a price for a specific data requester or a specific type of data requester and/or a particular type of data. For example, different companies may have different pricing structures for data. A company (company A) may be a data source 102A and may configure its data sharing permissions to charge a fee of X dollars for a single download of its sharable data, regardless of the amount of data. Another company (company B) may be a data source 102B and may configure its data sharing permissions to charge a flat fee of Y dollars for set download size and an additional fee of Z dollars for every kilobyte thereafter. Data sources 102 may configure their data sharing permissions to charge an access fee rather than per download (e.g. X dollars monthly, quarterly, annually, etc.). In another example, the data sources 102 may configure their data sharing permissions for a fee on a per "line" or "item" basis; a per transaction basis; another basis. In still another example, the data source 102 may configure its data sharing permissions to have a fee structure that can vary according to any of the above described fee structures based on the identity or type of the requester, type of requested data (e.g. data sharers may share some data, such as PII data, at a higher or lower price than other data), and so forth. Monies collected from data sales may be paid to the respective data sources 102.

When a requester device 112A, 112B, or 112C requests data, the DMS 108 may retrieve unfiltered data from the data warehouse 104 that matches the data request. The data sharing permissions from each data source can be applied to the unfiltered data by the DMS 108 using the generated executable to apply the data sharing permissions corresponding to data from that data source to filter the retrieved data to produce filtered data. The requester device 112A, 112B, or 112C may have the option to purchase the filtered data, in whole or in part, and may download the filtered data upon completion of applicable financial arrangements. A data source, such as 102A, 102B, or 102C, may offer to sell unfiltered data to a requester device for a price which may be higher than for filtered data.

When the purchase is complete, the DMS 108 may provide the filtered data in one more files to the requester device 112A, 112B, or 112C. The DMS 108 can provide the filtered data to the requester device 112A, 112B, or 112C via email, direct download, a clickable download link, file transfer protocol (FTP), a hardcopy (e.g. compact disc), or other methods not listed.

The requester devices 112A, 112B, and 112C may be operated by individual consumers or businesses (companies), and may be computers (e.g. desktops, laptops), mobile devices, a terminal, or other device. A user may interact with an interface (such as a GUI) at the requester device 112 to request data from the data warehouse 104 via the DMS 108. In response to the request, the DMS 108 may retrieve the data, apply the data sharing permissions to the data using an executable, and provide a GUI including the filtered data, which may be downloaded to the requester device, such as requester device 112A.

In some embodiments, company B may make a request for data to the DMS 108, which can search the data in the warehouse 104, including the PII and/or NPI data from company A for data corresponding to the request parameters. The DMS 108 may filter the search results corresponding to company A's data according to the data sharing permissions of company A, and may filter other retrieved data according to the data sharing permissions of the respective owners of the other retrieved data. The resulting data, after filtering, may be combined to form filtered data. The filtered data may be provided (or sold) to the requester (company B).

In other examples, company B may submit a request for data, which may cause DMS 108 to retrieve data that has associated data sharing permissions defining a fee schedule for access to that data. The DMS 108 may provide a GUI to the requester including payment options. The requester may then interact with the GUI to choose an acceptable payment option and/or to specify an amount that may be spent in retrieving such data. In some embodiments, the DMS 108 can apply the data sharing permissions to the retrieved data and based on the payment options selected by the requester to produce the filtered data. The filtered data may then be provided to the requester.

In yet another example, company A and company C may have different data sharing permissions, and can have different data, which may include some overlapping consumer information. When a requester requests data, the DMS 108 can search for data in the data warehouse corresponding to the search parameters. The DMS 108 can apply the respective permission settings of both companies to the data corresponding to the search parameters, and the resulting filtered data may be provided or sold to company B according to the price parameters configured by the data source 102. The pricing of the filtered data can be determined by the owner of a particular set of data. For example, the price for filtered data A can be set by company A, and the price for filtered data C may be set by company C, and both fees may be applied in the process of filtering the data.

On some embodiments, the data warehouse 104 may be separate from the DMS 108. In an example, the data warehouse 104 may be managed by a first company, and the DMS 108 may be a separate system that may be provided as an external data interchange system through which the data stored by the data warehouse 104 may be accessed. In such an embodiment, the DMS 108 can be coupled to the data warehouse through the network 103. However, the DMS 108, in some embodiments, may be included within the data warehouse 104. One possible example of such a system is described below with respect to FIG. 2.

Figure 2:
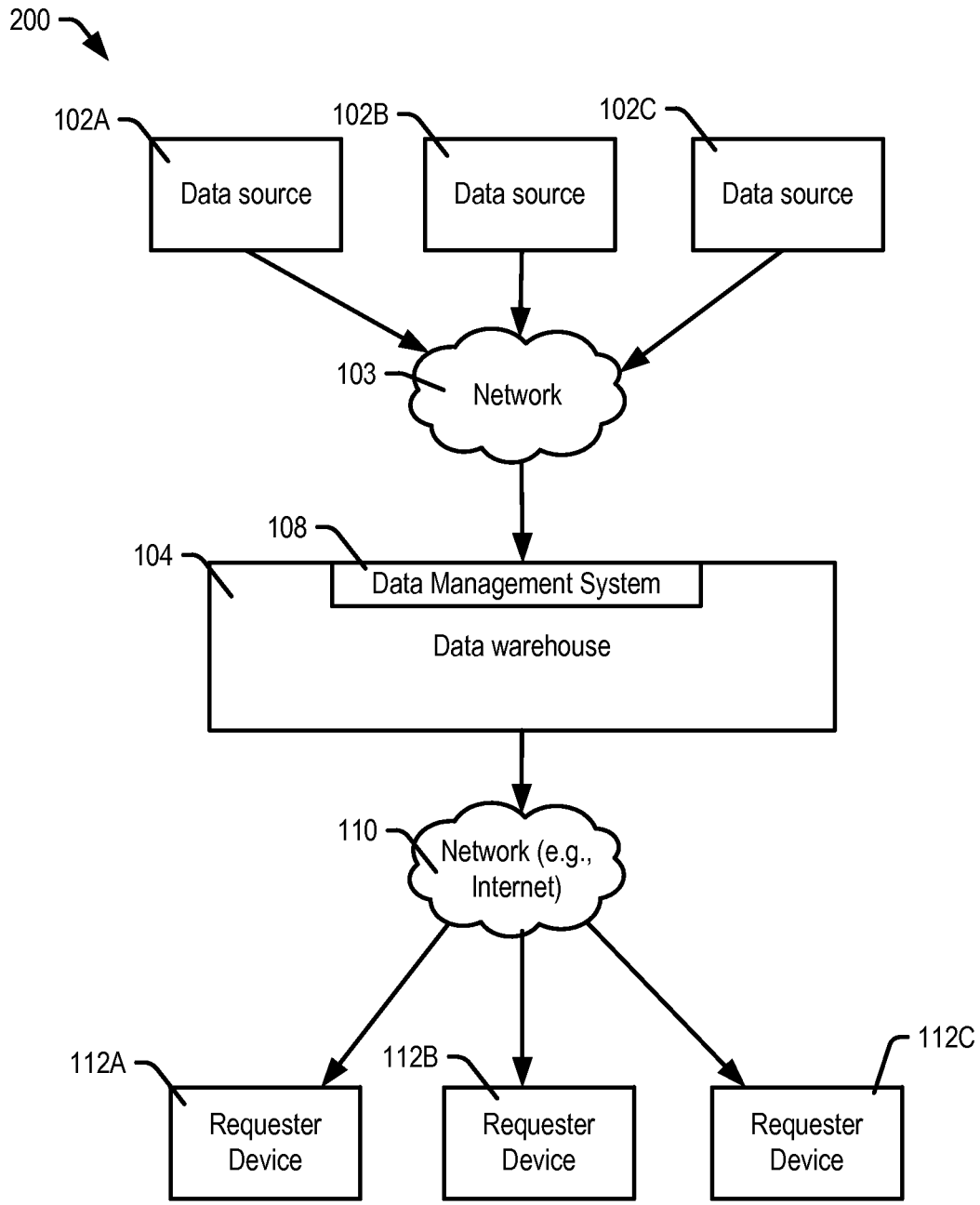
FIG. 2 is a block diagram of a system of permission-based data sharing according to some embodiments.

Referring to FIG. 2, a block diagram of a system of permission-based data sharing is shown and is generally designated 200. The system 200 includes the data warehouse 104 and the DMS 108 of FIG. 1. In this embodiment, the data warehouse 104 includes the DMS 108. The network 103, which would have otherwise connected the DMS 108 with the data warehouse 104, may be internal to the data warehouse 104 or may be omitted from the system 100. In the illustrated example of FIG. 2, the data sharing permissions (user-configured parameters) may be stored in the data warehouse 104.

In this example, the DMS 108 is integrated within the data warehouse 104 and may operate as the interface for the data warehouse 104. Further, in this example, the DMS 108 may store the data sharing permissions for the data of each data source 102A, 102B, and 102C with the data, such that the data sharing permissions may be returned with the search results. In some examples, the DMS 108 may include a filter application, such as filter application 109, which may be generated automatically by DMS 108 based on the data structure and the types of data permissions available for the data.

In the above examples, the systems and methods may rely on data sharing permissions defined by the data source 102 to determine whether the data may be shared, how much of the data may be shared, with whom the data may be shared, and whether to assess a fee for access to the data. The configurable data sharing permissions may be understood as defining an exclusion matrix, which may be applied by the generated executable to determine how the retrieved data may be filtered in order to produce filtered search results that may be provided to a requester. In the following examples, the exclusion matrix is presented in tables, which provide an illustrative example of a set of data sharing permissions associated with a plurality of companies.

Referring to FIG. 3, an example of an exclusion matrix for use with a system of permission-based data sharing is shown and is generally designated 300. An exclusion matrix (EM) 300 can include data sharing permissions that may be used by the DSM 108 to filter data retrieved from the data warehouse 104 in response to a request for data. The EM 300 may be provided to an administrator device via a website or a GUI, in a separate file such as a spreadsheet file, or in a written form that may be filled out and mailed or faxed prior to its data being shared. In an example, the EM 300 may be configurable by a user via a website interface or through an application GUI.

In some embodiments, the EM 300 may include multiple columns and rows that define data sharing permissions for a company's data. In the illustrated example, the EM lists multiple uses in a first column, and the data sharing permissions for a given company are provided in the other columns, such that the EM 300 may represent a list of data sharing permissions configurable by the data source 100 to selectively restrict access to the data for possible uses for the company's data. In an example, an administrator may configure parameters to define data sharing permissions based on the intended use. For example, a data source 102 may not want its data shared for marketing purposes, in which case the data source 102 can simply choose to prohibit data sharing with marketing companies or with other companies in the same industry as the company. In some cases, a company may wish to sell some information for marketing purposes, but not to everybody or not for every purpose. For example, a company may determine that its data should not be used to market products to children, and so may configure its data sharing permissions associated with marketing use and one or more category columns to meet that end. The EM 300 can include other categories such as sale price or domestic or foreign use. Further, the EM 300 may allow the data source 102 to selectively prevent data sharing of data corresponding to particular customers or types of customers.

In an embodiment, the EM 300 can be configured by the data source 102 to define data sharing permissions defining how its data can be accessed by data requesters. The DMS 108 can limit exposure of sensitive consumer information, such as PII data, as well as other information to help data sources to regain and retain control and create transparency with respect to how its data is accessed, and by whom. In some examples, the data source 102 may be a credit card company, and the data and associated data sharing permissions may be related to data sharing by lenders (such as credit card companies), for example, to fulfill their data reporting requirements to the national credit reporting agencies. Further, the DMS 108 is flexible enough to handle data corresponding to other industries, other data types and other data uses, even accommodating global expansion into other English speaking countries and even into non-English speaking countries. Data and the data sharing permission options may be specific to the data. Moreover, the DMS 108 may generate an executable, such as filter application 109, for each type of data, which may be configured based on the data sharing permissions to filter the associated data. When the retrieved data includes data from more than one data source, data attributable to the first data source 102A may be filtered by the executable configured with a first plurality of data sharing permissions. Further, second data attributable to the second data source 102B may be filtered by the executable configured with a second plurality of data sharing permissions, and so on.

The EM 300 allows the data source 102 to define data sharing permissions that allow the data source 102 to control access to its data, such as specifying the conditions under which a data requester can access the data source's data, which data requesters can access the data, which reseller data requesters can access the data, at what price, and so on. Further, the data source can define data sharing permissions that limit access based on a portfolio type, a consumer type, an individual (consumer) data element, and so on.

In some embodiments, the administrator can configure the GUI or web interface to set specific data sharing permissions to a predetermined value. Appearance and permission setting preferences may be saved via the GUI or web interface during or after each session, and may be loaded (manually or automatically) at the beginning of each session. An administrator can close or cancel a session at any time. In the illustrated example, the EM 300 may be tailored to a consumer credit industry and can include a plurality of columns and rows.

Referring to FIG. 4, an example embodiment of an exclusion matrix for use with a system of permission-based data sharing is shown and is generally designated 400. An exclusion matrix 400 can include uses for prescreening (e.g. marketing), extraction, bulk marketing, collections, triggers, consumer monitoring, and other uses (column 402). For example, an administrator may choose to share data used for prescreening with one or more portfolio types. The administrator can also choose what elements (e.g. credit limit, income, address, etc.) and/or consumer data to share, and to which requesters. The price may be fixed or may be based on the selected attributes of the filtered data.

In an embodiment, the DMS 108 may allow an administrator to configure the data sharing parameters to allow a data source 102 to specify whether or not to share a specific portfolio type (group of consumers) with a data requester 112 based on the type of request (represented by column 404 of EM 400). Such portfolio types may represent consumers grouped by payment history, age, business, age of credit line, and so on. The data source may vary the data sharing parameters for its data to have different restrictions depending on whether the request is a prescreen request, an extract data request, a bulk licensing request, a collections request, a consumer monitoring request, a triggers request, a direct mail request, an identity verification request, or some other type of request. In an embodiment, the DMS 108 may add additional data uses and store corresponding data sharing parameters, which new data uses may be driven by new customers or markets.

Further, the DMS 108 may allow an administrator to configure the data sharing parameters to allow a data source 102 to specify whether or not to share a specific individual consumer (element) (represented by columns 406 and 408 of EM 400) depending on whether the request is a prescreen request, an extract data request, a bulk licensing request, a collections request, a consumer monitoring request, a triggers request, a direct mail request, an identity verification request, or some other type of request. Additionally, the DMS 108 may allow an administrator to configure the data sharing parameters to specify whether or not to share data with a specific data requester (represented by column 410 of EM 400) and/or depending on whether the request is a prescreen request, an extract data request, a bulk licensing request, a collections request, a consumer monitoring request, a triggers request, a direct mail request, an identity verification request, or some other type of request. Further, the DMS 108 may allow an administrator to configure the data sharing parameters to specify whether or not to share data with a specific reseller (represented by column 412 of EM 400) and/or based on whether the request is a prescreen request, an extract data request, a bulk licensing request, a collections request, a consumer monitoring request, a triggers request, a direct mail request, an identity verification request, or some other type of request. Further, the DMS 108 may allow an administrator to configure the data sharing parameters to specify how much to charge (column 414 of EM 400) for access to the data based on the type of request.

In an embodiment, the DMS 108 may also provide a GUI to a user device that allows the user to specify how his/her identity can be used or what fee the consumer would like to be paid for access to his/her PII data. For example, the DMS 108 may allow a user to configure data sharing parameters for his/her data to entirely opt out of credit reporting or to require a fee to be paid for access to the PII and/or NPI data based on the type of request (e.g. prescreen request, extract data request, bulk licensing request, collections request, consumer monitoring request, triggers request, direct mail request, identity verification request, or some other type of request). The consumer-based EM may have fewer exclusion options, such as only allowing the consumer to set the fee and/or to limit the access to specific types of data requests.

It should be understood that the above-examples are possible embodiments of exclusion matrices 300 and 400, but that other parameters, such as other data request types, and other types of markets/buyers, may be included in the exclusion matrix. Further, as discussed above, an exclusion matrix can be configured for use by individual consumers. In an embodiment, a consumer exclusion matrix can allow an individual consumer to sell information pertaining to their identity to be used at all, for a fee, or for particular types of data requests.

Figure 5:
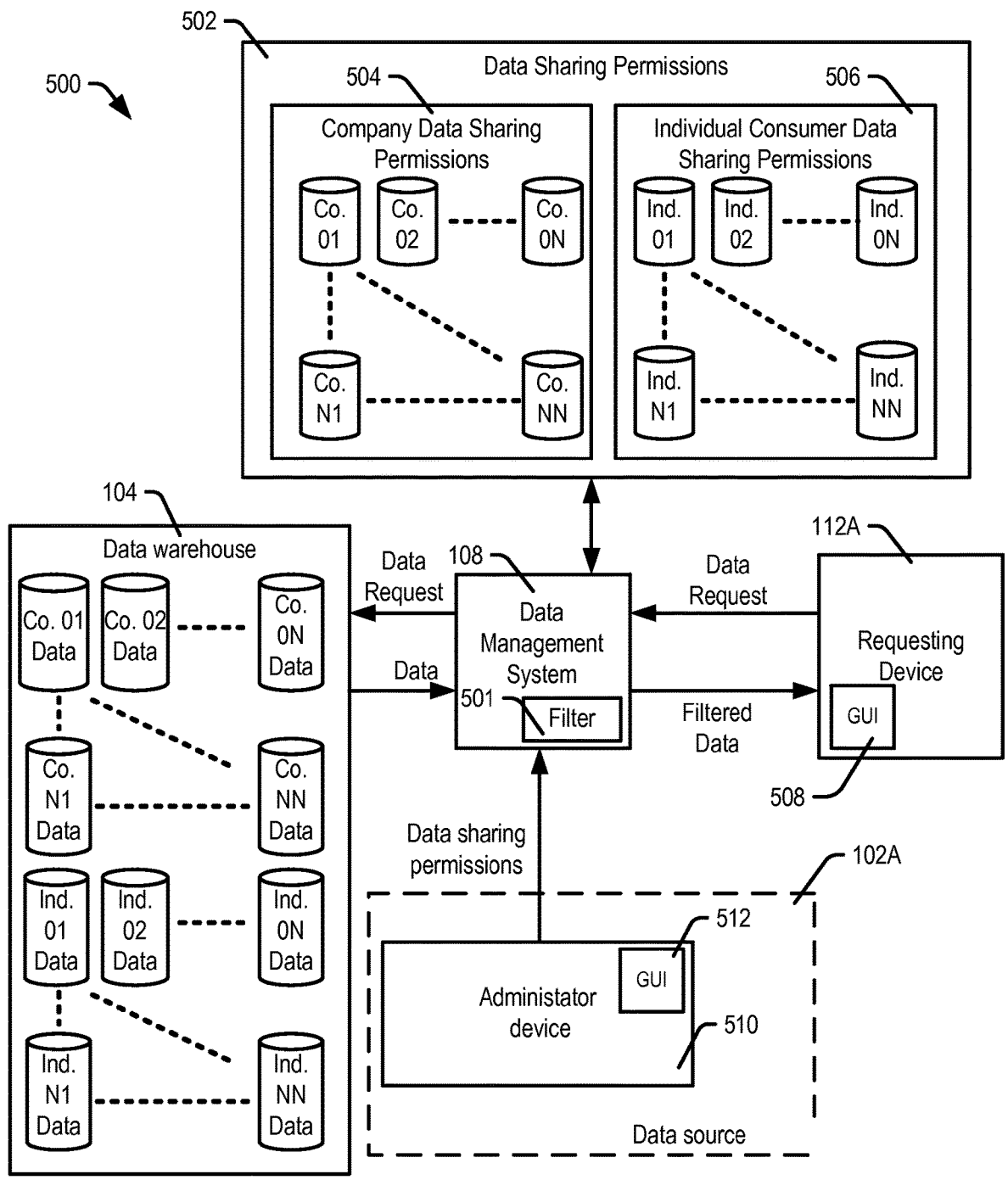
FIG. 5 is a block diagram of a system of permission-based data sharing according to some embodiments.

Referring to FIG. 5, a system of permission-based data sharing is shown and is generally designated 500. The system 500 may be an embodiment of the systems 100 and 200. The system 500 includes the DMS 108, which may be communicatively coupled to a data warehouse 104, to a requester device 112, and to an administrator device 510 of the data source 102A. The requester device 112 can include a GUI 508 that is provided by the DMS 108 that is stored locally on the requester device 112A, or that is provided by a server (not shown). The administrator device 510, which may be included in a data source, can include a GUI 512 also provided by the DMS 108, stored locally, or provided by a server (not shown). The GUIs 508 and 512 may be presented as structured text, such as a hypertext markup language document, an extensible markup language document, or another document, which can be rendered within an application running on the requester device 112A or the data source 102A, respectively. In an example, the GUIs 508 and 512 may be rendered within an Internet browser application. Alternatively, the GUI may be presented within some other type of application.

DMS 108 may be coupled to a data sharing permissions memory (DSPM) 502, which may include data sharing permissions for company information (company data sharing permissions memory (CM) 504 and data sharing permissions for individual consumers (individual consumer data sharing permissions memory (ICM) 506). Each company in the CM 504 may have one or more selectable sharing permissions, and the selectable sharing permissions provided by the DMS 108 to one company may be different than those provided to another company. For example, suppose Co. 01 is in a consumer credit industry and company Co. ON is in a defense industry. Since the provided selectable sharing permissions may depend, at least in part, on an industry category, the selectable sharing parameters provided to one company may differ from those provided to another company.

The ICM 506 may be similar to the CM 504 in that it can store selectable sharing permissions. Unlike the CM 504, however, the ICM 506 can store data including permissions for individual consumers. Individuals may be provided the same selectable data storing permissions as one another, although in some embodiments, the selectable data storing permissions may be different for one individual relative to another depending upon which category (or categories) (e.g. industry, credit level, income, etc.) into which the individual is grouped. The DMS 108 may receive data from various companies, and the data from each company may be different. In an embodiment, the data from each company may include PII and/or NPI data for multiple consumers. The PII data may be stored in a memory that is exclusive to the company within the data warehouse 104 so that the company data is maintained separately. The DMS 108 may also receive data sharing permissions from each of the companies that defines the parameters by which that company's data may be shared with others. In one embodiment, the DMS 108 may store the data sharing permissions with the PII data in the memory in the data warehouse 104. In the illustrated example, the data sharing permissions are stored in the DSPM 502 together with a company identifier linking the data sharing permissions in DSPM 502 to the company data stored in the data warehouse 104.

In an embodiment, a user may access the GUI 512 using the administrator device 510 to configure one or more data sharing permissions. The user may need to log in and be authenticated as an authorized administrator for that company's data before the GUI 512 is even provided to the administrator device 510. Assuming that the user is authorized, the user may configure the one or more data sharing permissions and may select a button or link within the GUI 512 to send data related to the data sharing permissions to the DMS 108, which may store the data sharing permissions to the DSPM 502. DMS 108 may share data stored in the data warehouse 104 according to the data sharing permissions stored in the DSPM 502.

A requester device 112 may send a request to the DMS 108 for data. The request may correspond to data in the data warehouse 104 belonging to some or all of the companies or individuals, or any combination thereof. In an example, the request may correspond to the information from data sets sold by companies Co. 02 and Co. N1 stored in the data warehouse 104. The DMS 108 may apply the permission filters corresponding to the configured data sharing permissions provided by Co. 02 and Co. N1, and apply the filters to the search results retrieved from the data warehouse 104, filtering the results from Co. 02 and Co. N1 using the data sharing permissions from Co. 02 and Co. N1, respectively. The filtered data may be sent to the requester device. In some embodiments, a requester can optionally mail or fax in a written request, which may include Boolean operators, along with a means to meet any applicable financial obligations for access to the filtered data. In response to the transmitted request, the DMS 108 may be configured to produce a report that includes the "sharable" information corresponding to the request and may send the report according to a means specified in the request (e.g., mail, email, file transfer protocol download, etc.).

Figure 6:
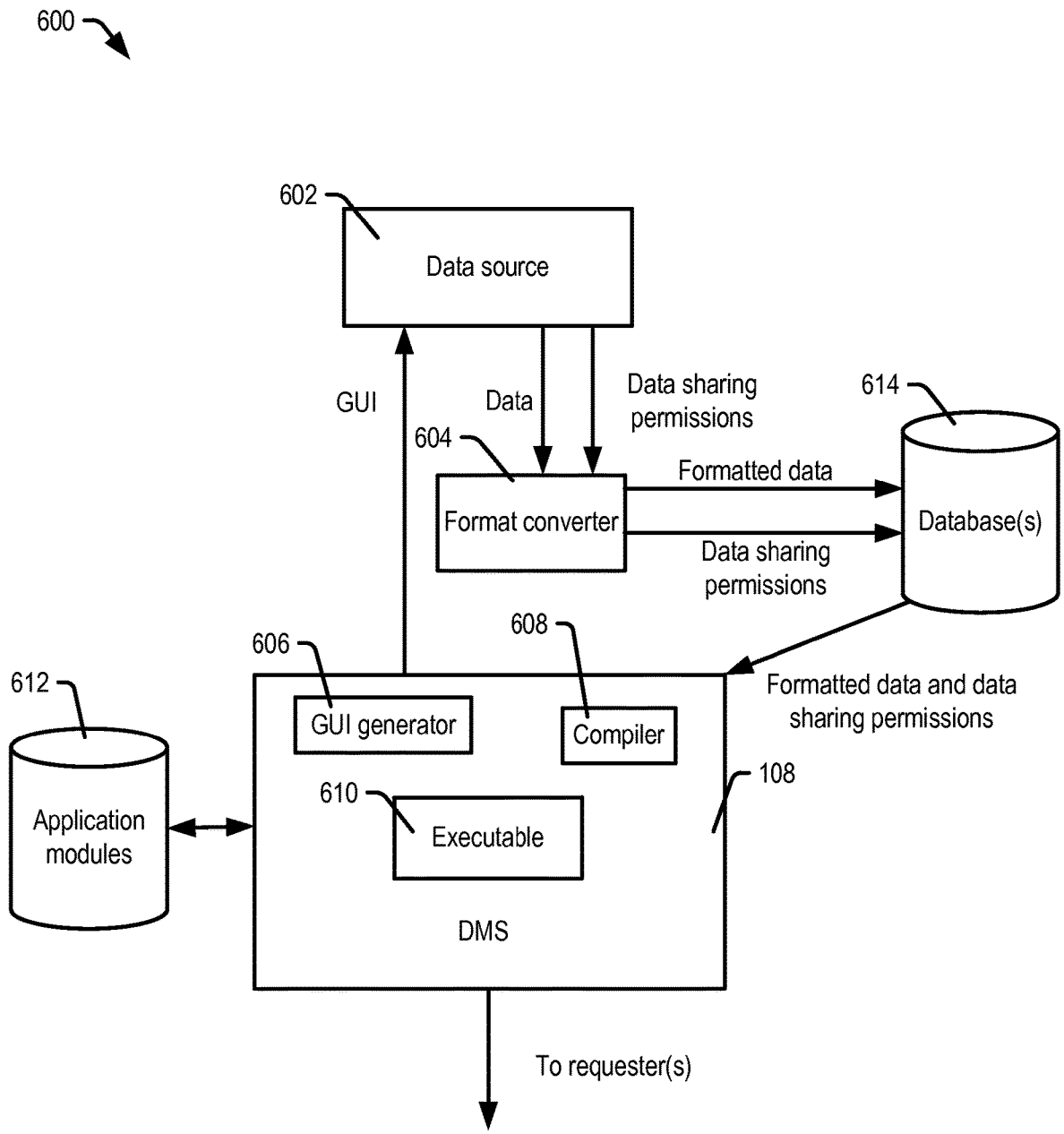
FIG. 6 is a block diagram of a system of permission-based data sharing according to some embodiments.

Referring to FIG. 6, a system of permission-based data sharing is shown and is generally designated 600. System 600 can be an embodiment of systems 100, 200, and 500. System 600 can include a data source 602, which may be data source 102A, 102B, or 102C, instruction sets database 612, database(s) 614, DMS 108, and format converter 604. DMS 108 can include a GUI generator 606, compiler 608, and executable 610. The executable 610, compiler 608, instruction sets database 612, other data or executable application, or any combination thereof, may be part of the filter application 109.

The data source 602 can provide data and data sharing permissions to the format converter 604, via a network (e.g. network 103). The data provided to the format converter 604 by the data source 602 may be in a different format than is compatible with database(s) 614. For example, the data source 602 may provide dates in a "dd/mm/yyyy" format, while the database(s) 614 may be configured to store dates in an "mm/dd/yyyy" format. The format converter 604 can contain instructions that, when executed, cause the processor to convert the data to a format compatible with the database (s) 614. The format converter 604 may send the formatted data and the data sharing permissions to the database(s) 614. Further, the format converter 604 may also rearrange the data to correspond to fields within the databases 614. The formatted data and data sharing permission may be transmitted via a network (e.g. network 103).

When the data is first provided to the DMS 108, an administrator of the DMS 108 may generate the format converter 604 to convert the data and to process subsequent data uploads. Further, based on the data types of the databases 614 and the service being provided, the DMS 108 may retrieve selected instructions or modules from the instruction sets database 612 and may compile them using the compiler 608 to produce the executable 610. Instruction sets database 612 can contain instructions that define data processing techniques that correspond to the types of data being processed. The instruction sets database 612 can include compiled machine code, executable code, programming instructions, scripts, or any combination thereof. In some embodiments, one or more items from the instructions sets database 612 may be selected based on the data types within the database 614 and may be processed by the compiler 608 to produce the executable 610. Databases 614 can store data of different types, and the type of data stored can vary from database to database. For example, database "A" may store data types "X, Y, Z", while database "B" may store data types "C, D, Q, Y". For the DMS 108 to provide data from database "A", modules pertaining to data types "X,Y,Z" may be compiled by the compiler 608 to produce an associated executable 610 configurable by the DMS 108 based on the associated data sharing permissions to filter the data to produce filtered data. For the DMS 108 to provide data from database "B", the DMS 108 may configure a different executable associated with that database (which may include modules pertaining to data types "C,D,Q,Y") based on data sharing permissions associated with that data to produce filtered data. In some embodiments, the executable 610 may be compiled automatically in response to detecting a change in the data structures of the databases 614. In other embodiments, the executable 610 may be compiled or recompiled periodically or in response to a triggering event, such as an action taken by a database administrator to initiate a compile operation.

In some cases, new data types may be added to one or more databases 614. For example, data type "AA", which had not been previously included in a database 614, may be added to at least one of the databases 614, or may be included in a new database. An application module corresponding to the new data "AA" may be generated by the DMS 108, an administrator device, or another device, and may be stored in instruction sets database 612. The GUI generator 606 can provided updated GUIs to the data source 602 as new data types become available to allow an administrator to configure data sharing permissions for its data set relative to the new data type. The executable 610 can include instructions that, when executed, cause the processor to configure the executable 610 based on the data sharing permissions and to filter data from the databases 614 according to the data sharing permissions corresponding to the data.

In an example, the database 614 may include a data type "D" data structure. For example, data type "D" can refer to a date. The instruction sets database 612 may include a set of instructions for filtering or otherwise processing data type "D" and may thus be compiled with other instruction modules to produce the executable 610, which then may be used to filter a single date or a date range for data according to its data sharing permissions. The executable 610 can provide the filtered data to the requesting device.

In an embodiment, a data requester may request data from the DMS 108. The DMS 108 may retrieve data and corresponding data sharing permissions in response to the request. The retrieved data may be data that was provided by multiple different data sources together with the data sharing permissions from those different data sources. The DMS 108 may filter first data associated with a first data source according to first data permissions configured by the first data source to produce first filtered data. The DMS 108 may also filter second data associated with a second data source according to second data permissions configured by the second data source to produce second filtered data. The DMS 108 may filter each datum according to its associated data sharing permission to produce corresponding filtered data. Once the data has been processed or filtered, the DMS 108 may aggregate the first filtered data, the second filtered data, and other data to produce an output, which may be sent to the data requester. The filtering operations may include excluding records, fields, PII, or portions of the records and may include altering portions of the data to render the subject of the data anonymous.

In the above discussion, the executable 610 is described as embodying the instructions for performing a variety of operations for filtering data. In an alternative example, the executable 610 may be configured to access scripts, schema, instructions, or any combination thereof from instruction sets database 612 as needed ("on the fly") to process the retrieved data.

Figure 7:
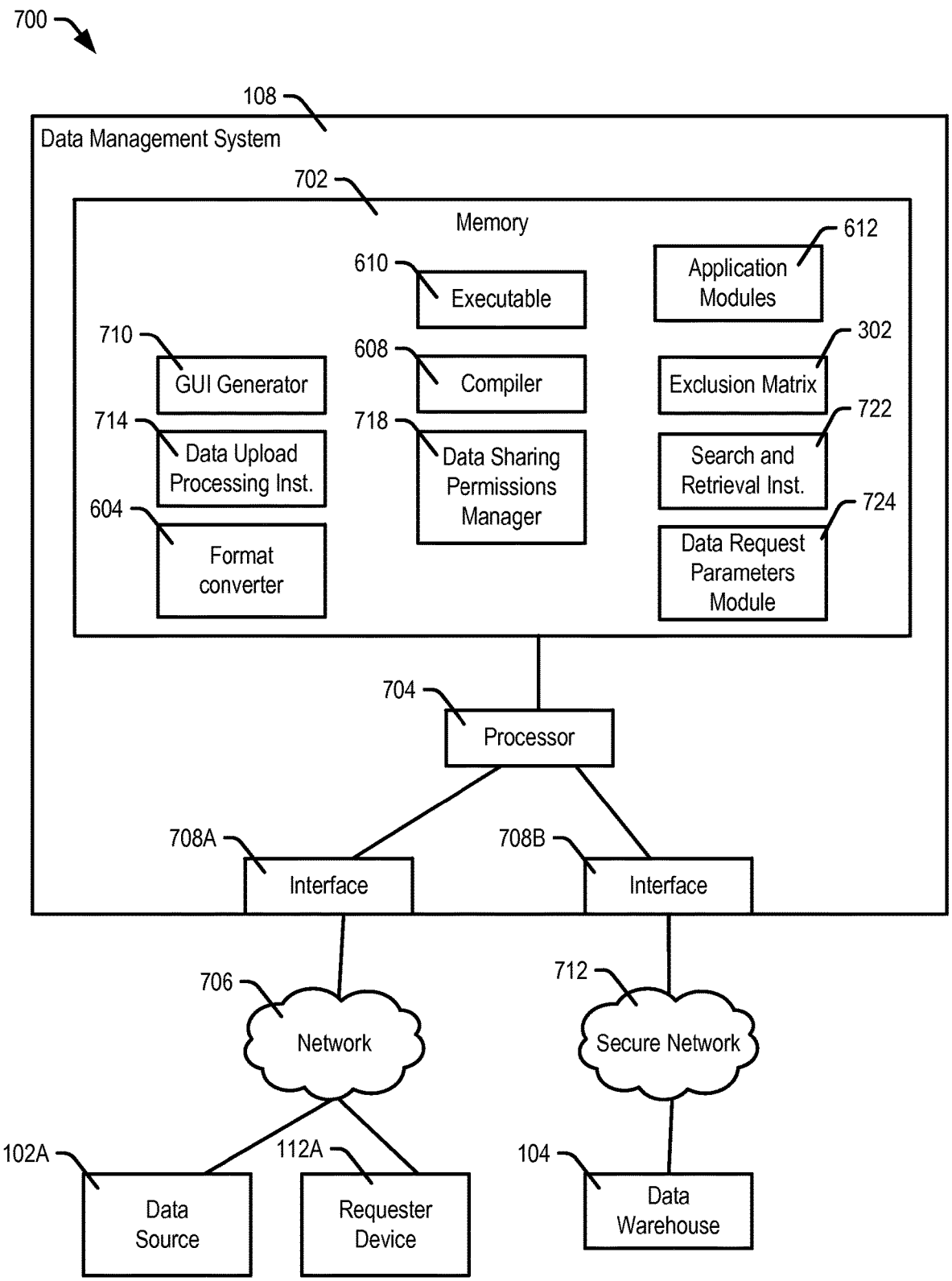
FIG. 7 is a block diagram of a system of permission-based data sharing according to some embodiments.

Referring to FIG. 7, a system of permission-based data sharing is shown and is generally designated 700. The system 700 may be an embodiment of systems 100, 200, 400, 500, and 600. The DMS 108 may have an interface 708A that may couple to a data sharer 102A or a requester device 112A via a network (e.g. the Internet) 706. The network 706 may be network 103, network 106, network 110, or another type network (or may include any combination thereof). The DMS 108 may also couple to another interface 708B that can couple to a data warehouse 104 via a secure network 712. In some embodiments, the data warehouse 104 may couple to the DMS 108 through network 706, or via another network, in which case, the network 712 may be omitted. The DMS 108 may include a processor 704 that can couple to the interfaces 708A and 708B, and to a memory 702.

The memory 702 can store data and processor-readable instructions, some of which may be executed by the processor 704. For example, the memory 702 may include a graphical user interface (GUI) generator 710 that, when executed, causes processor 704 to generate GUIs and to provide the GUIs to the user devices, such as requester device 112A and data source 102A. In some embodiments, the GUI generator 710 may include GUI generator 606 (in FIG. 6). The GUI may include user selectable elements, such as radio buttons, check boxes, text fields, buttons, pull-down menus, click links, tabs, other user-selectable elements, or any combination thereof. Some of the user selectable elements of the GUI may relate to user-selectable data sharing permissions corresponding to options from the exclusion matrix 300 (in FIG. 3) or the exclusion matrix 400 (in FIG. 4). The format converter 604 may include instructions that, when executed, cause the processor 704 to receive data from a data sharer 102A, process the data into a format suitable for the data warehouse 104, and upload the data (e.g. a data set) from the data sharer 102A to the data warehouse 104. In an example, the GUI may present a file browser window through which a user may select a file, attach the file, and upload it.

The memory 702 may further include search and retrieval instructions 722 that, when executed, cause the processor 704 to receive a data request from a requester device 112A, search the data warehouse 104 for data corresponding to the data request, and retrieve the data corresponding to the data request. The memory 702 may also include data request parameter instructions 724 that, when executed, cause the processor 704 to send a GUI including selectable search request elements to a requester device 112 and to receive a search request from the requester device 112 in response to the GUI. The memory 702 further includes a data sharing permissions manager 718 that, when executed, causes the processor 704 to determine data sharing permissions associated with the retrieved data. In some embodiments, the data sharing permissions may be retrieved with the retrieved data from execution of the search and retrieval instructions 722. The compiler 608 includes instructions that, when executed, cause the processor 704 to retrieve one or more instruction sets from the instruction sets database 612 based on data structures within the data warehouse 104 and to compile them to produce the executable 610, which may be configured based on data sharing permissions for a particular set of retrieved data and to filter the data based on such data sharing permissions in order to produce filtered data, which may be provided to the requester device 112A. In some embodiments, functions performed by the processor 704 can be performed by multiple processors across one or more platforms. Further, instructions stored in memory 702 may also be distributed, and multiple computing systems may cooperate to perform the operations described herein.

In the illustrated example of FIG. 7, the permission-based sharing system 700 is presented for illustrative purposes only. In other embodiments, other instruction modules may be included, instruction modules may be combined, and/or components may be added or omitted. For example, though some of the functions have been described as being implemented in separate instruction blocks, instructions may be combined and/or additional instructions sets may be included, depending on the implementation.

Figure 8:
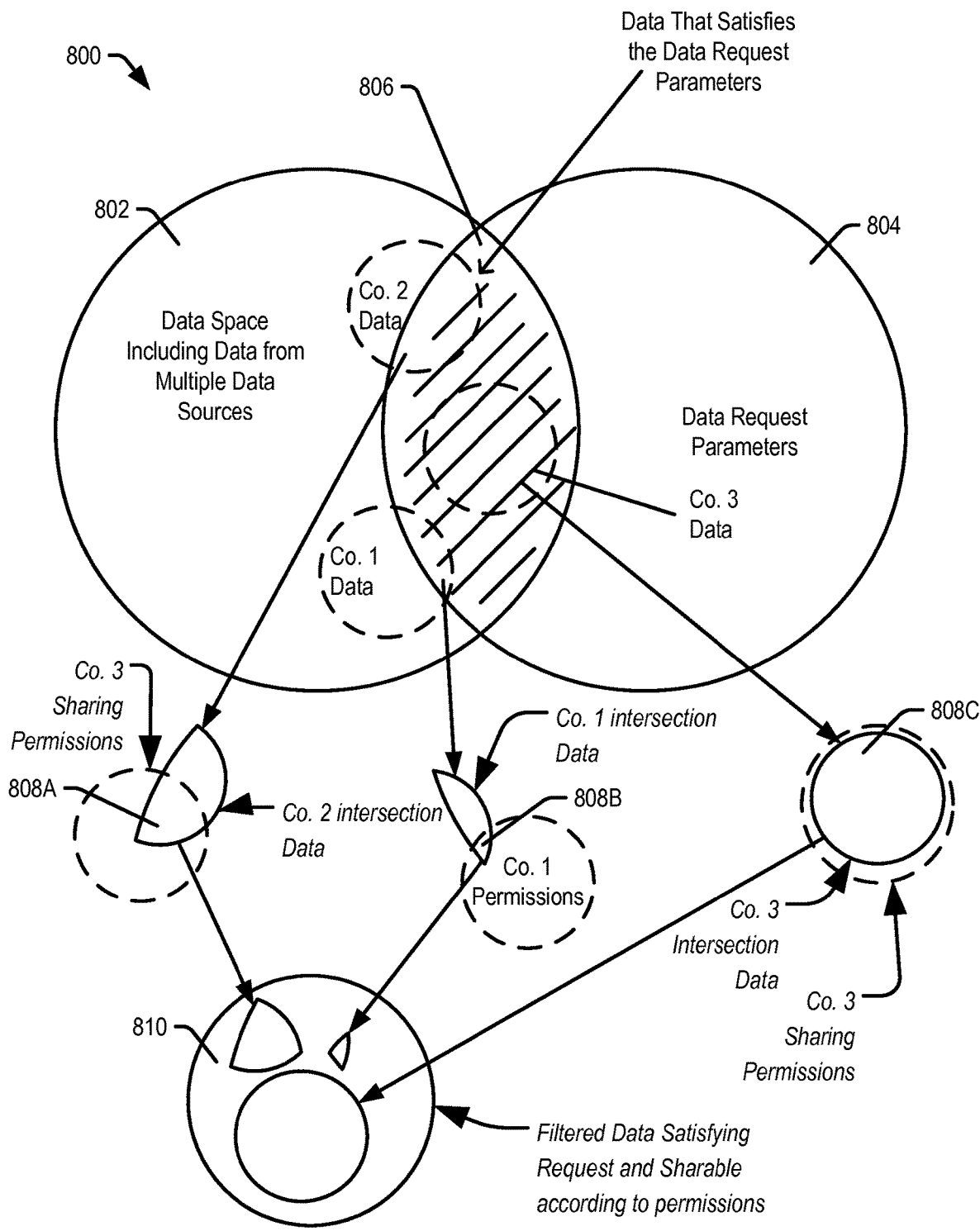
FIG. 8 is a Venn diagram of filtered data provided by a permission-based data sharing system according to some embodiments.
Figure 9:
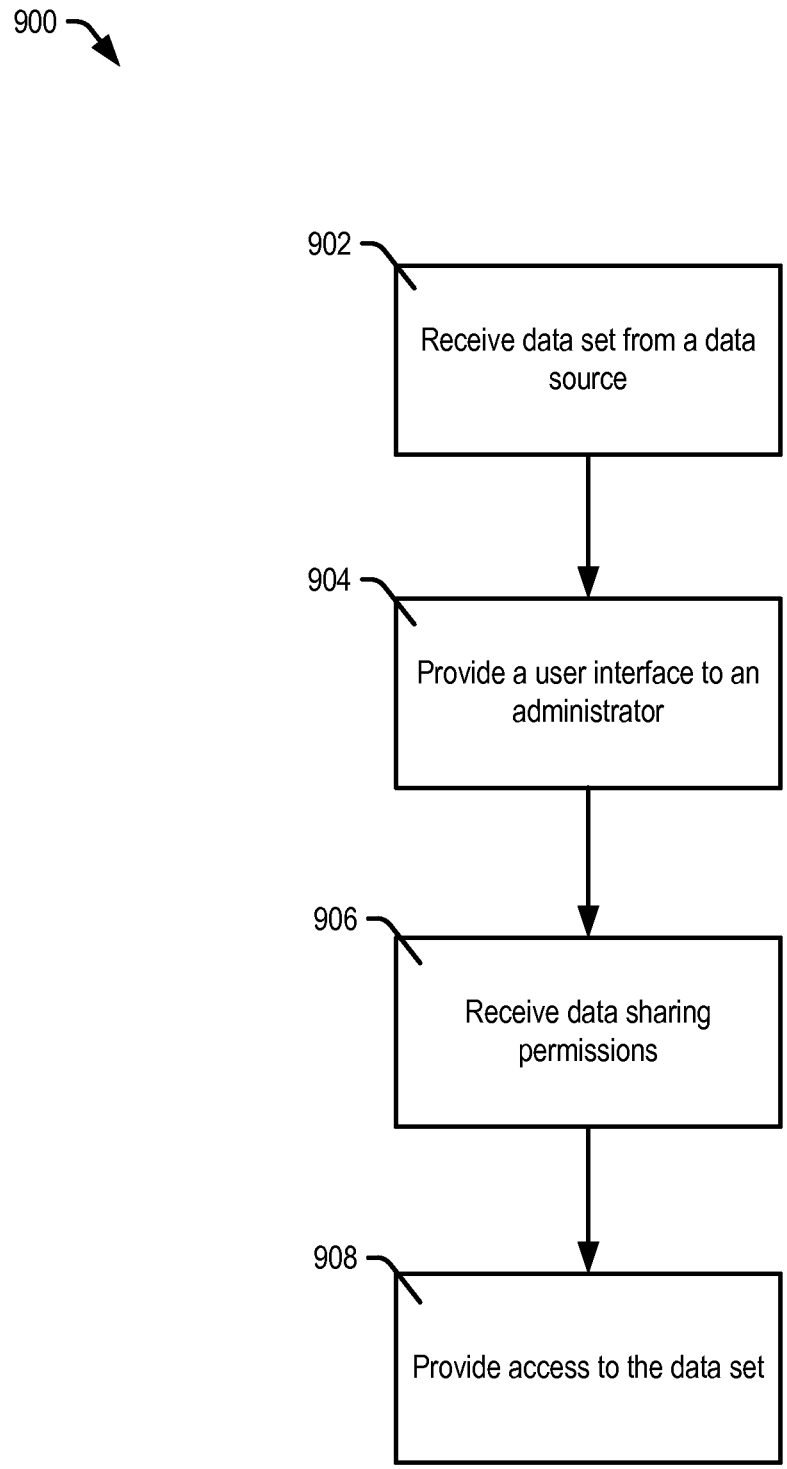
FIG. 9 is a flowchart of a method of permission-based data sharing, according to some embodiments.

Referring to FIG. 8, a Venn diagram of permission-based data sharing is shown and generally designated 800. The Venn diagram 800 includes a data space 802 that represents the entire data space of the data warehouse 104, which data space 802 can include data from some or all of the data sharers. For example, the data space 802 can include data from companies (Co. 1, Co. 2, and Co. 3). A data request from a requester device 112 may partially overlap the data space 802 (as represented by data request 804). The data request 804 represents the selected request parameters included in a data request. Data from the data space 802 that corresponds to the data request 804 is represented by shaded area 806. If no limitations were placed on the data sharing, the data corresponding to the shaded area 806 would be provided to the requester.

In the illustrated example, only some of the data in the subset of the shaded area 806 may be sharable. The data sharing permissions of each data source may limit the data available to the data requester. For example, overlap data 808A, 808B, and 808C represent areas of overlap between the data sharing permissions of each data source and the data of that data source that corresponds to the data request from the requester. The overlap data 808A, 808B, and 808C as well as other "sharable" data may be aggregated to form filtered data 810, which represents the retrieved data that has satisfied the data request and that is sharable according to the data sharing permissions selected by the various data sharers.

The filtered data 810 may change based on data request and/or based on the data sharing permissions. For instance, a data sharer (data source 102) can choose not to share any data when the requester is a competitor. In another example, the data space 802 and the data request 804 may provide no overlap or may provide overlap only with respect to restricted data. In such an instance, the filtered data 810 may include no information.

Referring to FIG. 900, a flowchart of a method of permission-based data sharing is shown and generally designated 900. At 902, the DMS 108 receives data from one or more data sources. The data may include PII data, business information, other information, or any combination thereof, from one or more of the data sources. The DMS 108 may store the data in separate memories or separate memory areas, maintaining the proprietary data of each data source separate from that of other data sources.

At 904, the DMS 108 can provide a user interface to an administrator device 510 via a network (e.g. network 103). In an example, the user interface is provided to an administrator device 510 associated with the source of the data. The user interface can be a GUI, web interface, or other interface not listed, and can include one or more user-selectable elements (e.g. selectable options, links, buttons, tabs, etc.), accessible by a user to configure data sharing permissions corresponding to the data set.

At 906, the DMS 108 can receive data sharing permissions corresponding to the data set from the administrator device 510 in response to the user interface. The data sharing permissions may correspond to selections of the selectable elements within the user interface. At 908, the DMS 108 can provide access to the requested data from the data set according to the data sharing permissions. For example, the DMS 108 can receive a data request. The DMS 108 can retrieve data and data sharing permissions in response to the request and can filter the retrieved data according to the data request parameters to produce filtered data, which may be provided to the requester. In an example, the data may correspond to different data sources and may have different data permissions. Accordingly, the DMS 108 can filter data from a first data source using first data permissions and can filter data from a second data source using second data permissions. The resulting filtered data may be combined to produce filtered results, which may be provided to the data requester.

In an embodiment, the DMS 108 may provide a user interface to a requester device 112A via a network 110, and may also receive request parameters corresponding from the requester device 112A in response to the user interface. The DMS 108 may retrieve data based on the request, may apply filters (by configuring the executable 610) based on the data sharing permissions to produce filtered data, and may provide the filtered data to the requester device 112A.

The processes, machines, and manufactures (and improvements thereof) described herein are particularly useful improvements for computers providing PII data, LII data or both and for industries of companies that maintain such data. Further, the embodiments and examples herein provide improvements in the technology of consumer and lender information sharing. In addition, embodiments and examples herein provide improvements to the functioning of a computer by providing search results with data filtered according to data sharing permissions, thereby creating a specific purpose computer by adding such technology. Thus, the improvements herein provide for technical advantages, such as providing a system through which a data owner may share data while maintain control over how the data may be used and with whom the data may be shared. For example, the systems and processes described herein can be particularly useful to any systems in which a user may want to buy, lease, rent, search, exchange, bid, or barter for data. Further, the improvements herein provide additional technical advantages, such as providing a system through which a data owner may share data while restricting its use or even monetizing access to portions of the data. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system for providing data according to data sharing permissions, the system comprising:
an interface configured to communicate with a network;
a processor coupled to the interface; and
a memory accessible to the processor and storing instructions, that when executed by the processor, cause the processor to:
receive data at a processor of a computing system, in response to a request received through a network from a computing device associated with a data requester, the data including first data and associated first data sharing permissions assigned to the first data by a first data owner, the first data sharing permissions stored with the first data in a data warehouse and defining limitations on access to the first data by others, the data further including second data and associated second data sharing permissions assigned to the second data by a second data owner, the second data sharing permissions stored with the second data in the data warehouse and defining limitations on access to the second data by others, the first data, with its associated first data sharing permissions, and the second data, with its associated second data sharing permissions, stored separately in separate exclusive memory areas of the data warehouse to maintain proprietary data of the first data owner and the second data owner, the received request including a unique identifier for the data requester and a purpose indicator for the intended use of the first data and the second data by the data requester;
automatically apply the first data sharing permissions to the first data to produce first filtered data based on at least (1) the unique identifier for the data requester and (2) the intended use by the data requester;
automatically apply the second data sharing permissions to the second data to produce second filtered data based on at least (1) the unique identifier for the data requester and (2) the intended use by the data requester;
determine a first access fee for the first filtered data and a second access fee for the second filtered data;
provide the requestor with an option to make financial arrangements with respect to the first access fee or the second access fee; and
provide an output based on the financial arrangements.

2. The system of claim 1, wherein the first owner and the second owner are not associated with the system.

3. The system of claim 1, wherein the memory further includes instructions that, when executed, cause the processor to:
receive a request from the data requester; and
retrieve the first data and the second data from the data warehouse in response to the request.

4. The system of claim 1, wherein the first data sharing permissions are configurable by the first owner to restrict access to the first data based on a purpose for which the first data is requested.

5. The system of claim 4, wherein the first data sharing permissions allow access to a first portion of the first data in response to a credit report request from an entity and allow access to a second portion of the first data in response to a marketing data request from the entity.

6. The system of claim 5, wherein the first portion includes personally identifying information of one or more consumers and the second portion excludes at least a portion of the personally identifying information of the one or more consumers.

7. The system of claim 1, wherein the memory further includes instructions that, when executed, cause the processor to:
provide a graphical user interface to the first owner, the graphical user interface including one or more user-selectable elements accessible by a user to configure the first data sharing permissions;
receive user input corresponding to user selection of at least one of the one or more user-selectable elements defining the first data sharing permissions; and
storing the user input as the first data sharing permissions in the data warehouse.

8. The system of claim 7, wherein the user input configures an exclusion matrix, the exclusion matrix defining filters and exclusions for sharing the first data.

9. The system of claim 1, wherein the first access fee is determined using the first data sharing permissions and the second access fee is determined using the second data sharing permissions.

10. The system of claim 1, wherein the memory further includes instructions that, when executed, cause the processor to:
determine a third access fee for the first data and a fourth access fee for the second data; and
provide the requestor with an option to make financial arrangements with respect to the first access fee, the second access fee, the third access fee, and the fourth access fee.

11. A method of providing data according to data sharing permissions, the method comprising:
receiving data at a processor of a computing system in response to a request received through a network from a computing device associated with a data requester, the data including first data and associated first data sharing permissions assigned to the first data by a first data owner, the first data sharing permissions stored with the first data in a data warehouse and defining limitations on access to the first data by others, the data further including second data and associated second data sharing permissions assigned to the second data by a second data owner, the second data sharing permissions stored with the second data in the data warehouse and defining limitations on access to the second data by others, the first data, with its associated first data sharing permissions, and the second data, with its associated second data sharing permissions, stored separately in separate exclusive memory areas of the data warehouse to maintain proprietary data of the first data owner and the second data owner, the received request including a unique identifier for the data requester and a purpose indicator for the intended use of the first data and the second data by the data requester;
automatically applying the first data sharing permissions to the first data to produce first filtered data based on at least (1) the unique identifier for the data requester and (2) the intended use by the data requester;
automatically applying the second data sharing permissions to the second data to produce second filtered data based on at least (1) the unique identifier for the data requester and (2) the intended use by the data requester;
determining a first access fee for the first filtered data and a second access fee for the second filtered data;
providing the requestor with an option to make financial arrangements with respect to the first access fee or the second access fee; and
providing an output based on the financial arrangements.

12. The method of claim 11, further comprising anonymizing the first filtered data based on the first data sharing permissions by automatically removing at least one of personally identifying information (PO) and non-personally identifying information (NPI).

13. The method of claim 11, further comprising filtering information about specific entities from the first data by applying the first data sharing permissions.

14. The method of claim 11, further comprising applying the first data sharing permissions to the first data to filter specific individuals.

15. The method of claim 11, further comprising applying the first data sharing permissions to the first data to filter specific categories of information.

16. The method of claim 11, further comprising applying the first data sharing permissions to the first data to filter specific characteristics of consumers.

17. The method of claim 11, further comprising applying the first data sharing permissions to the first data to filter selected data fields.

18. The method of claim 11, wherein the first access fee is determined using the first data sharing permissions and the second access fee is determined using the second data sharing permissions.

19. The method of claim 11, further comprising:
determining a third access fee for the first data and a fourth access fee for the second data; and
providing the requestor with an option to make financial arrangements with respect to the first access fee, the second access fee, the third access fee, and the fourth access fee.

20. The method of claim 11, further comprising:
providing the requestor with an option to make financial arrangements with respect to only a portion of the first access fee or the second access fee.

* * * * *